(12) United States Patent
Holt

(10) Patent No.: US 7,700,909 B2
(45) Date of Patent: Apr. 20, 2010

(54) METHOD AND APPARATUS FOR AUTO-CALIBRATION OF A CT SCANNER

(75) Inventor: Kevin M. Holt, Chicago, IL (US)

(73) Assignee: Varian Medical Systems, Inc., Palo Alto, CA (US)

( * ) Notice: Subject to any disclaimer, the term of this patent is extended or adjusted under 35 U.S.C. 154(b) by 0 days.

(21) Appl. No.: 12/091,610

(22) PCT Filed: Oct. 27, 2005

(86) PCT No.: PCT/US2005/039121

§ 371 (c)(1),
(2), (4) Date: Apr. 25, 2008

(87) PCT Pub. No.: WO2007/050083

PCT Pub. Date: May 3, 2007

(65) Prior Publication Data

US 2008/0279342 A1    Nov. 13, 2008

(51) Int. Cl.
*G01D 18/00* (2006.01)
*G01T 1/164* (2006.01)
(52) U.S. Cl. ................ 250/252.1; 250/363.09
(58) Field of Classification Search ........... 250/252.1, 250/338.1, 363.09, 363.03; 378/207
See application file for complete search history.

(56) References Cited

U.S. PATENT DOCUMENTS

| 4,228,515 | A | 10/1980 | Genna et al. |
| 4,305,127 | A | 12/1981 | Heuscher |
| 5,450,461 | A | 9/1995 | Hsieh |
| 5,786,594 | A * | 7/1998 | Ito et al. ............... 250/236 |
| 7,569,829 | B2 * | 8/2009 | Chen et al. ............ 250/363.09 |
| 2003/0072409 | A1 | 4/2003 | Kaufhold et al. |
| 2006/0115054 | A1 | 6/2006 | Yatsenko et al. |
| 2007/0295897 | A1 * | 12/2007 | Lyoussi et al. .......... 250/252.1 |

OTHER PUBLICATIONS

International Search Report for PCT/US05/39121, Oct. 12, 2006.

* cited by examiner

*Primary Examiner*—David P Porta
*Assistant Examiner*—Faye Boosalis
(74) *Attorney, Agent, or Firm*—Fitch Even Tabin & Flannery

(57) ABSTRACT

A method of and apparatus for automatically calibrating a computed tomography ("CT") scanning system (100) is provided including providing (405) a calibration object (130) substantially centered on a translating table (120) for passing through the CT system (100). The system (100) scans (410) the calibration object (130) and provides (420) a preliminary representation such as a display (500) of a sorted sinogram of the object (130). From that preliminary representation, the system (100) determines intercept-related and/or slope-related values for at least a portion (510, 520, 530 or 540) of the preliminary representation and uses these values to calculate (440) one or more predetermined calibrations values.

25 Claims, 5 Drawing Sheets

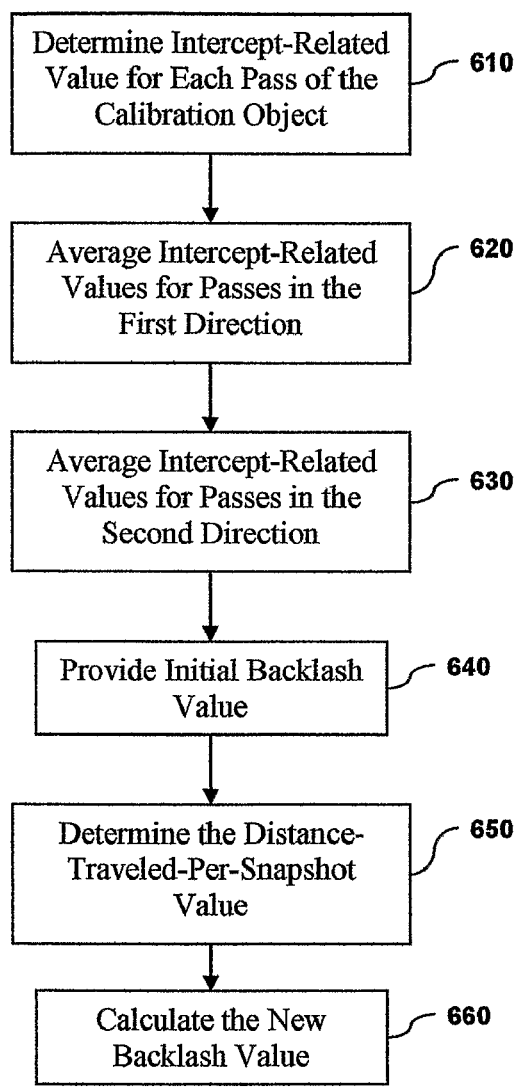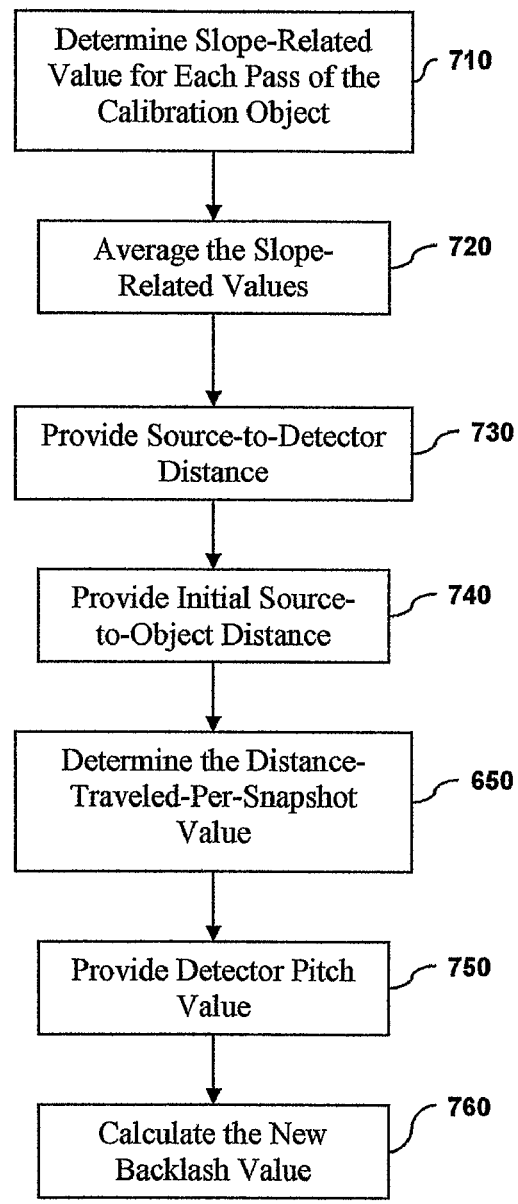

METHOD AND APPARATUS FOR AUTO-CALIBRATION OF A CT SCANNER

TECHNICAL FIELD

This invention relates generally to the field of computer tomography ("CT") scanning systems and more particularly to auto-calibration of CT scanning systems.

BACKGROUND

Computer tomography ("CT" or "CAT") scanning systems are generally known in the art. The first CT scanners used a source of X-rays directed as a beam and a single detector to detect the amount of X-rays passing through the scanned object. During a scan of an object, the source and detector are passed through a line on the object, then the source and detector is moved relative to the object and scanned through another line on the object. Data is collected from each scan into an array that is manipulated by a computer to provide a variety of images of the object. These provided images are called reconstructions or reconstructed images.

So called "second generation" CT scanners use a fan-shaped X-ray beam and a corresponding plurality of detectors arranged along the fan. Similar to earlier CT scanners, a second generation CT scanner may be moved relative to the scanned object to collect a full set of readings on the object. In between scans, the object may be rotated to expose a different portion of the object to the X-ray source. In other prior scanners, the object may be rotated during translation or movement across the scanner.

Several known algorithms exist for creating the reconstructed images of an object scanned by CT scanners. These algorithms use various geometric values relating to the physical CT scanning system to manipulate the collected scan data into the reconstructed images. Sometimes, however, the reconstructed images of an object contain undesirable visual aberrations or distortions called artifacts that render the final images difficult or impossible to use or understand. Often times, these artifacts are due to imprecise geometries of the CT scanning system. It is known to manually manipulate the scanning systems to reduce or eliminate such artifacts for any given scanning system; such manual manipulation, however, is time consuming, error prone, and requires a trained operator.

BRIEF DESCRIPTION OF THE DRAWINGS

The above needs are at least partially met through provision of the method and apparatus for auto-calibration of a CT scanner described in the following detailed description, particularly when studied in conjunction with the drawings, wherein:

FIG. 6 is a flow diagram for a method as configured in accordance with various embodiments of the invention; and FIG. 7 is a flow diagram for a method as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the arts will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a method of and apparatus for automatically calibrating a computed tomography ("CT") scanning system is provided including a calibration object substantially centered on a translating table for passing through the CT system. The system scans the calibration object and provides a preliminary representation of the object. From that preliminary representation, the system automatically determines intercept-related and/or slope-related values for at least a portion of the preliminary representation and uses these values to calculate one or more predetermined calibrations values to apply in algorithms for providing reconstructed images.

The scanning system provides for automatic calibration of the CT system to reduce the number and/or severity of artifacts seen in the reconstructed images provided by the scanner without the need for physical or manual manipulation of the scanner. Therefore, the need for a trained operator to conduct typical scanning set up is reduced as is the typical set-up time for various scans.

Figure 1:
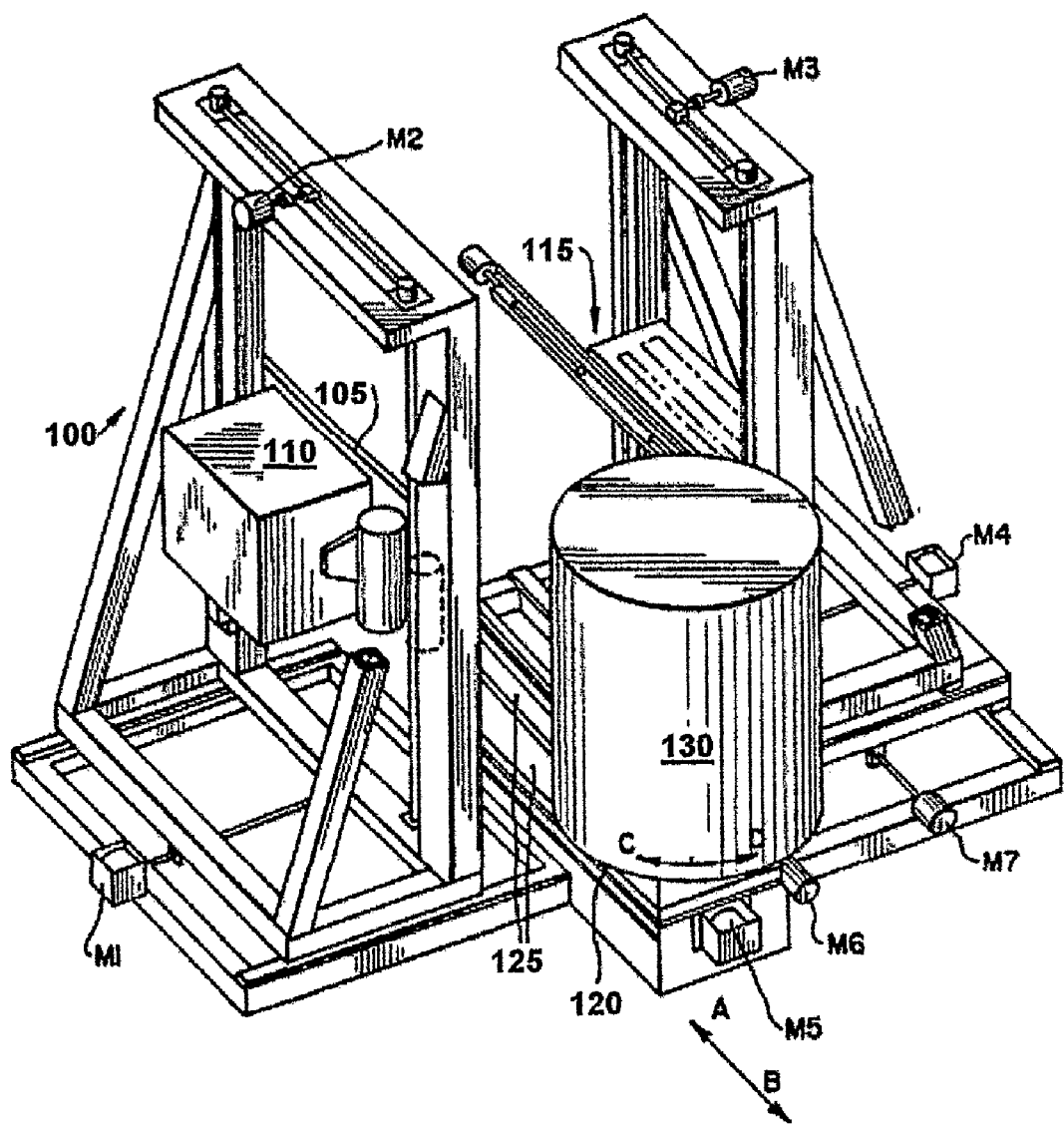
FIG. 1 is a perspective view of a CT scanning system as configured in accordance with various embodiments of the invention.

Referring now to the drawings, and in particular to FIG. 1, a CT scanning system 100 is provided, including a frame 105 for supporting an X-ray source 110 and a detector 115 opposite the X-ray source 110. A translating table 120 is capable of moving an object 130 between the X-ray source 110 and the detector 115 along tracks 125 in the direction indicated by the line A-B. The translating table 120 is also capable of rotating the object 130 as indicated by the line C-D. The frame 100 includes a plurality of motors M1, M2, M3, M4, M5, M6, and M7 for moving the various parts including the source 110, detector 115, and/or translating table 120 relative to one another to conduct various scans. The number and/or placement of the motors may be changed to fit a given application. One skilled in the art will recognize that the object 130 may remain stationary or the source 110 and/or the detector 115 may remain stationary to effect relative movement, translation or rotation, during a scan. One skilled in the art will also recognize that the general construction of the CT scanning system 100 as depicted is an example of a typical second generation scanner and the invention as described herein may be practiced with modified second generation systems or other types of CT scanners.

Figure 2:
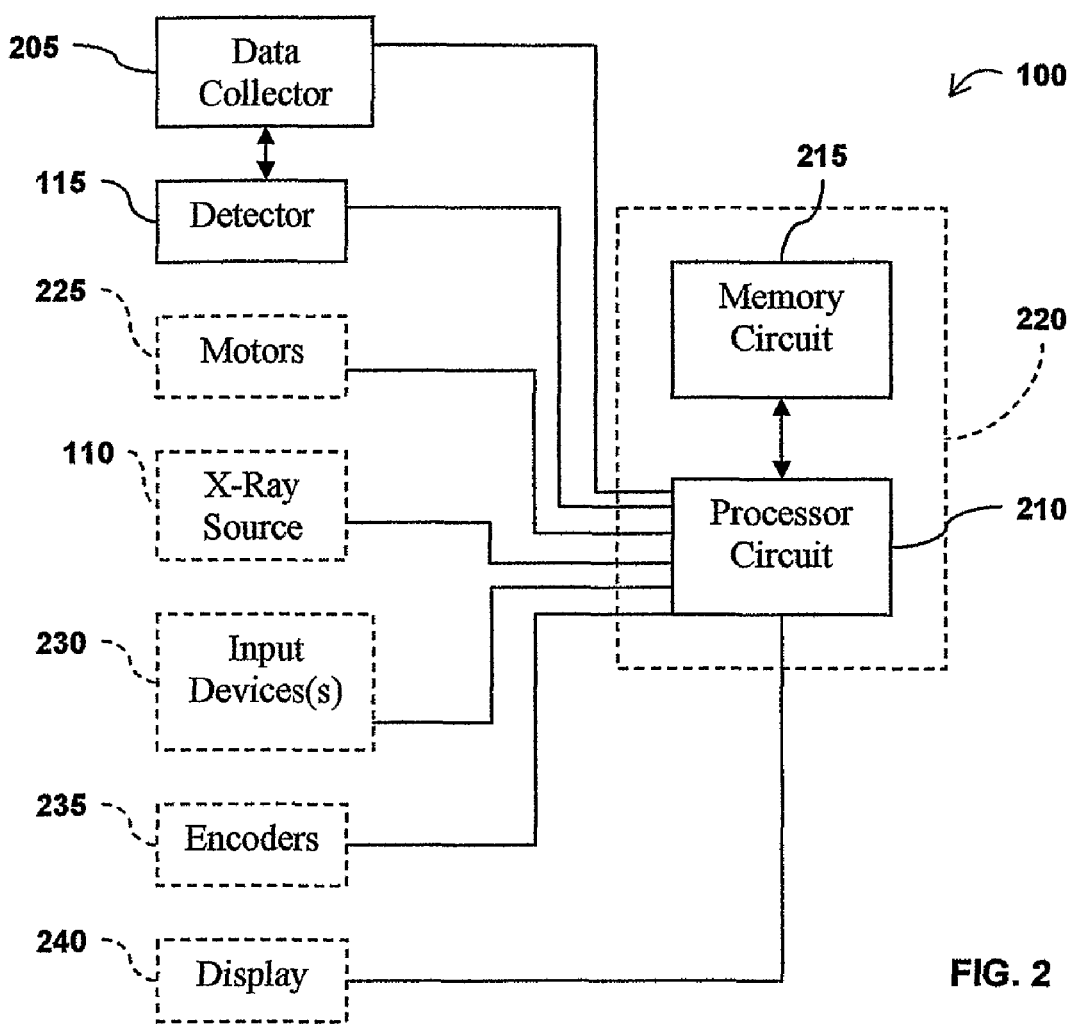
FIG. 2 is a block diagram of a CT scanning system as configured in accordance with various embodiments of the invention.

With reference now to FIG. 2, a data collector 205 is operably coupled to the detector 115 for collecting data. The data collector 205 may be a hardware device directly coupled to the detector 115 for creating signals to send to a processor circuit 210, or the data collector 205 may be other hardware and associated enabling software otherwise operably connected to the detector 115 and processor circuit 210. A memory circuit 215 stores values regarding the CT scanning system 100 and may store data from the data collector 215 regarding the scans performed by the system 100. The processor circuit 210 is associated with the data collector 205 and the memory circuit 215 for calculating a source-to-object distance and a backlash value for the scanning system according to a predetermined function of the data and the values regarding the CT scanning system 100. The memory circuit 215 and processor circuit 210 may be incorporated into a single computing device or automatic calibrator 220, such as a personal computer with enabling software, that is operably coupled to the other devices or elements. The details of such a coupling are known in the art and are therefore omitted here for the sake of brevity. The enabling software can be readily developed by one skilled in the art to perform the various embodiments for making the calibration calculations described below.

The processor circuit 210 and/or automatic calibrator 220 may be operably coupled to various elements of the CT scanning system 100 to control the system 100. For instance, the motors, collectively indicated as 225, and the X-ray source may be controlled by the processor circuit 210 and associated software. The X-ray source may be 150 KV or 420 KV tube, a 2 MeV linear accelerator, or other appropriate source of imaging radiation including known and appropriate focusing and/or collimating apparatuses and shielding. Further, an input device 230 such as a keyboard or mouse may be provided for the automatic calibrator 220 for providing certain inputs and/or values for controlling the system 100. Encoders 235 on the tracks 125 and/or the translating table 120 may be included to measure the location and/or the rotation of the object 130 during scanning. Also, a display 240 may be included to further the ease of control of the system 100 by an operator or to provide preliminary representations or reconstructed images of objects scanned by the system 100.

Figure 3:
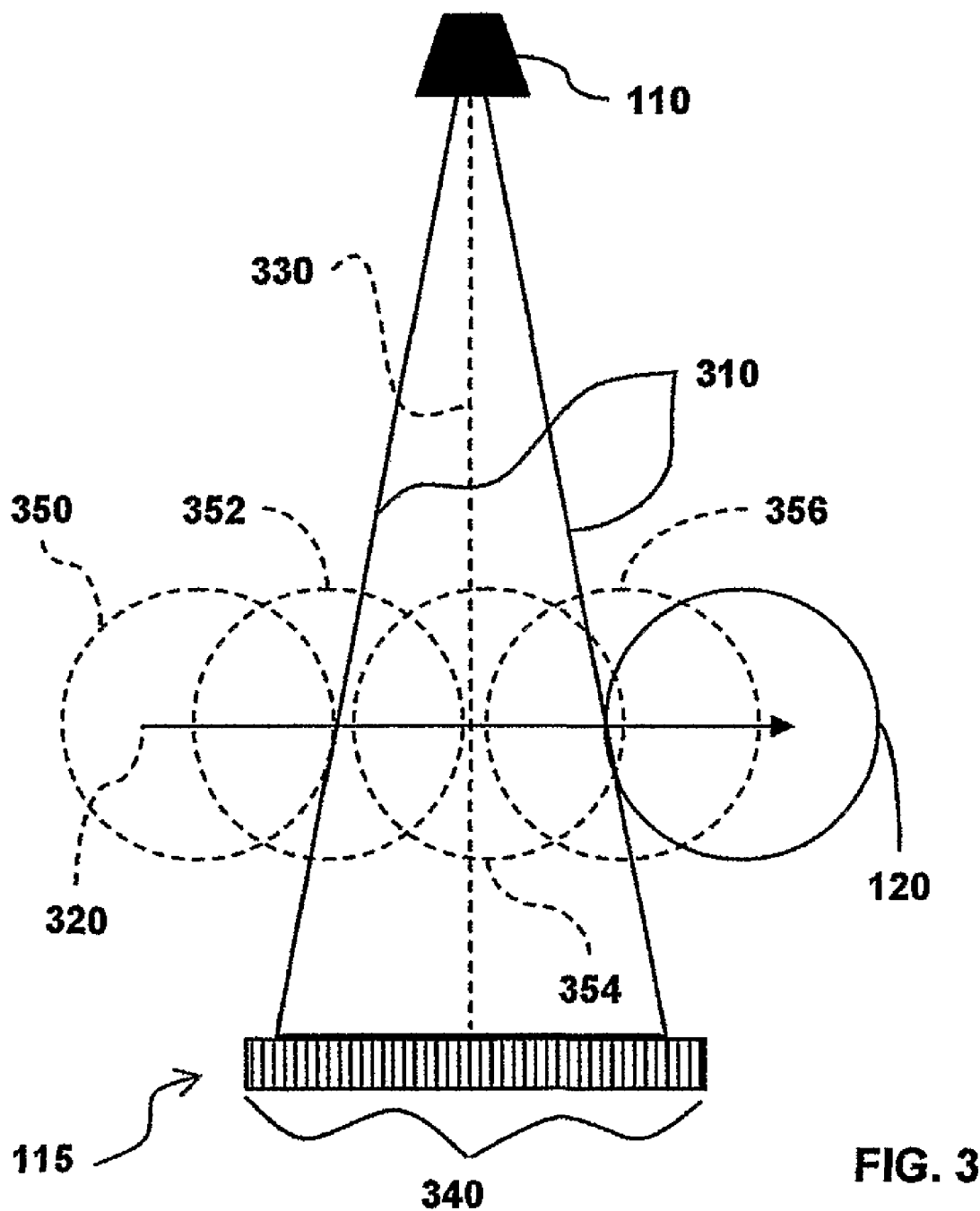
FIG. 3 is a plan view representation of a source of X-rays, detector array, and translating table as the table moves across the fan of X-rays.

The various values stored by the memory circuit 215 and/or calculated by the processor circuit 210 will be described with reference to FIG. 3. These values include a source-to-detector distance, an initial source-to-object distance, a distance-traveled-per-snapshot value, a detector pitch value, a detector shape profile, an initial backlash value, and a plurality of angles indicating, for each of a plurality of detector channels, an angle between a ray drawn from a source to the detector channel and a ray drawn from the source perpendicular to the translation path. The X-ray source 110 typically emits a fan 310 of X-rays through the path of the translating table 120 detected by detector 115. The translating table 120 rotates about a rotation axis, typically in the center of the translation table 120. The rotation axis, if centered on a translation table that traverses in a straight line across the fan 310, will travel along the line as indicated by arrow 320. The source-to-object distance is usually defined as the distance from the source 110 to the rotation axis of the translating table 120 along a line perpendicular to the translation path 320, for example from the source 110 along the line denoted by reference numeral 330 to the translation path 320.

The source-to-detector distance is the distance between the source 110 and the detector 115. As known in the art, a detector 115 for a typical second generation CT scanning system will include a plurality of detector elements where each element creates an electrical signal that can be collected by the data collector 205. The elements may be provided in a number of forms known in the art such as scintillation crystals, gas chambers, continuous detectors with transistor elements, and so forth. The detector 115 typically includes a plurality of detector channels, collectively labeled with reference numeral 340, with a detector element in each channel. The plurality of detector channels 340 is often chosen to approximately span the useable width of the fan 310. The plurality of detector channels 340 may be curved, usually to be approximately focused on the source 110, or may be aligned in a straight line as depicted in FIG. 3. Alternatively, the detector channels 340 may be arranged in a polygonal approximation of a curved detector 115. These detector 115 shapes are considered the detector shape profile that is stored or input into the memory circuit 215 for use by the calibration method. The value of the source-to-detector distance will depend on which portions of the detector 115 geometry are used to measure the distance, for example the distance from the source to the front of the closest detector element, the distance from the source to the effective X-ray stopping point within the closest detector element, the distance from the source to the chord of the detector arc, and so forth as known by those in the art. These values are typically provided by the manufacturer of the system 100, may be measured and input through the input device 230 by a user, or may be determined by the system 100 using known algorithms.

The detector pitch value is the average distance from a predetermined portion of one detector element in the plurality of detector channels 340 to the equivalent portion of the next detector element. This value is a constant dependant on the geometry of the detector 115. The predetermined portion of the detector element used to determine the detector pitch value should be the same predetermined portion used to determine the source-to-detector distance. Typically the detector pitch value is input into the system by an operator or by the manufacturer of the system 100.

As will be understood in the following discussion, the detector pitch value and source-to-detector distance, are used in specific embodiments where these values can be approximate substitutions for the plurality of angles indicating, for each of the plurality of detector channels 340, the angle between a ray drawn from the source 110 to the detector channel and a ray perpendicular to the translation path. Alternatively, these angles may be measured or calculated by other readily developed algorithms.

The distance-traveled-per-snapshot value is the amount of distance traveled by the translating table 120 in between data collections by the scanning system 100. In some scanning systems 100, the translating table 120 will move a set distance, stop, and the scanner will take a measurement before moving the translating table 120 to the next stop. For example, the translating table 120 may make several stops 350, 352, 354, and 356 across the fan 310 to collect data. Alternatively, the translating table 120 may move continuously through the fan 310 with the system' 100 collecting data when the translating table 120 is at several points 350, 352, 354, and 356. In another alternative, the system 100 may collect data during the object's 130 movement through the system such that each datum is integrated over a range of positions but is considered to have a single effective position of collection or effective data collection point 350, 352, 354, or 356. The distance between the data collection points 350, 352, 354, and 356 is the distance-traveled-per-snapshot value. This value may be determined based on a preprogrammed scanning algorithm. Alternatively, the distance-traveled-persnapshot value may be determined by reading the distance traveled from the encoders 235 on the tracks 125.

In a different alternative, the distance-traveled-per-snapshot value may not be constant throughout any given scan. For example, data may be collected during acceleration or deceleration of the translation table 120 such that each column or row of the data array does not correspond to an equal distance traveled by scanned object 130. In this embodiment, the collected data may be re-sampled via a known algorithm to equalize the spacing between columns or rows of data, or in other words interpolating the data into a new array for which the distance-traveled-per-snapshot value is constant. The interpolation step can be performed to give an arbitrary spacing, but the spacing will usually be chosen to be equal to the nominal or average measured distance-traveled-per-snapshot value. This spacing becomes the distance-traveled-per-snapshot value used in the calibration for this type of embodiment. In another alternative, the scanning system marks each snapshot with a measured table position, and the calibration algorithm uses these measured positions. This avoids the need for resampling the data.

The backlash value refers to the difference in the physical position of the object 130 when scanning in a first direction across the fan 310 versus the physical position of the object 130 when scanning in a second direction opposite to the first direction. When scanning an object 130, certain time efficiencies may be gained by moving the scanned object 130 back and forth across the fan 310 while taking images at the same stopping or data collection points 350, 352, 354, and 356. Due to physical limitations, however, the object 130 may not be in exactly the same position when data is collected at the data collection points 350, 352, 354, and 356 when traveling in the first direction as when compared to the second direction. For instance, the time at which the encoder is strobed will generally not be at the effective center of the detector integration pulse, or there may be physical limitations or errors in the tracks 125 and the encoders 235. Such issues may result in a different position for the object at a given data collection point 350, 352, 354, or 356 even though the encoder 235 may indicate that the object 130 is in the same location. This error or difference in position between the two scanning directions is the backlash. Any backlash in the system 100 may cause unacceptable aberrations in the reconstructed image; therefore, reconstruction algorithms may include a backlash value to account for this common physical limitation within a given system 100.

Figure 4:
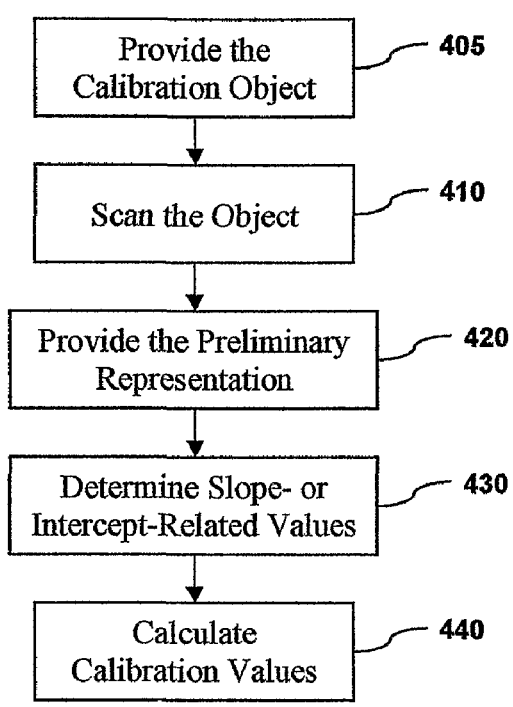
FIG. 4 is a flow diagram for a method as configured in accordance with various embodiments of the invention.

A method of operating an embodiment of the CT scanner will be described with reference to FIG. 4. A calibration object 130 is provided 405 substantially centered on the translating table 120 for passing through the CT scanning system 100. The calibration object 130 can be any object with a known geometry. Typically, the calibration object 130 will be a pin because the geometry of a pin, typically a thin and relative small cylindrical object, is known and can be easily manipulated for calibration purposes. The calibration object 130 is substantially centered on the translating table 120 to correspond to the rotation axis of the translating table 120 and so that the center of the calibration object 130 may be easily determined.

The system 100 then scans 410 the calibration object 130. Scanning the calibration object 130 may include any predetermined number of scans or passes across the X-ray beam fan 310. Typically, the scan includes passing the calibration object 130 through the scanning system 100 in a first direction and then passing the calibration object 130 through the scanning system 100 in a second direction opposite to the first direction. Those skilled in the art will recognize that the path across the fan 310 may be in a straight line or on a curved path depending on the configuration of the system 100, and the calibration method described herein may be applied to the embodiment with a curved path with minor modifications readily performed by one skilled in the art using the known geometry of the curved path. Scanning the calibration object 130 may also include rotating the calibration object 130 a predetermined amount in between passes through the system 100. In some cases, the process of passing the calibration object 130 through the system 100, rotating the object 130, and passing the calibration object 130 through the system may be repeated a predetermined number of times as is necessary to rotate the calibration object 130 by 360 degrees.

After scanning 410 the calibration object 130, a preliminary representation of the calibration object 130 is provided 420. The preliminary representation typically consists of an array of data collected during the scanning 410 indexed according to the detector channel number, the effective position of the translating table 120 at the time the data was collected, and the pass number. Normally, the data is sorted to parallel, as known in the art, so that the data for each pass of the calibration objection 130 is properly aligned in the array such that the index of the array organizes the data to be shown as a parallel-beam view of the object 130 at a given time during the scan. Often, this sorted data is considered a sorted sinogram. The calibration method will be described primarily with reference to data from the sorted sinogram, but the calibration may readily be adapted to incorporate the sorting algorithm without separately sorting the data such that the method may be applied directly to unsorted data.

Figure 5:
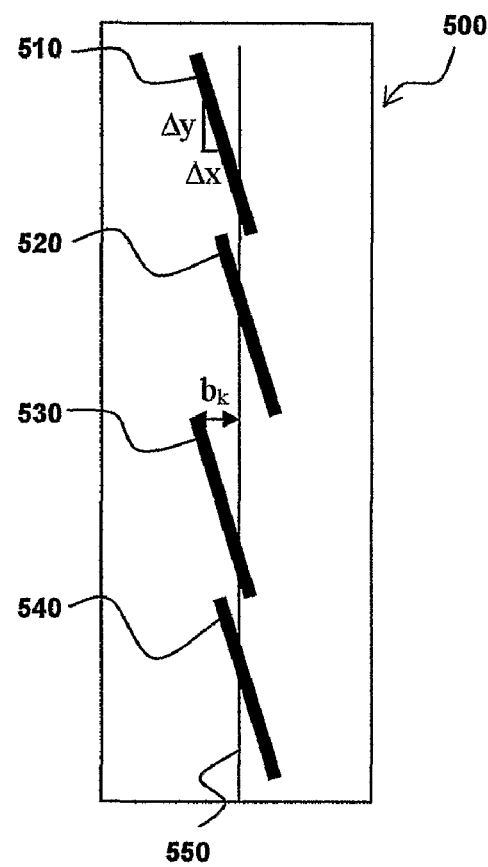
FIG. 5 is a representation of a calibration object as produced in accordance with the operation of various embodiments of the invention.

The sorted sinogram may be displayed to a user on the visual display 240. A fully reconstructed image may also be used for the calibration, but full reconstruction typically requires a large amount of calculation not necessary for calibration; thus, when possible, calibration typically only uses a preliminary representation such as the sorted sinogram. One such display 500 of a sorted sinogram is shown in FIG. 5 where the calibration object 130 is a pin placed vertically and substantially at the center of the translation table 120. Because of certain inconsistencies in the geometry of the system 100, aberrations in the display exhibit themselves as unaligned portions 510, 520, 530, and 540 of the pin. The illustrated pin portions 510, 520, 530, and 540 correspond to each pass of the pin through the scanning system 100 and are offset from the expected center line 550 for the vertical pin. The processor circuit 210 determines 430 an intercept-related value and/or a slope-related value for at least a portion of the preliminary representation of the calibration object 130. Then, the automatic calibrator 220 calculates 440 a predetermined calibration value using the intercept-related value and/or the slope-related value. These values are determined in such a way that after sorting the sinogram with the new predetermined calibration value the display of the sorted sinogram shows the pin in the expected position.

With reference to FIG. 6 and continuing reference to FIG. 5, an embodiment of the determination 430 of the intercept-related value and calculation 440 of a calibration value will be further described. The intercept-related value is determined 610 for each portion of the preliminary representation corresponding to each pass of the calibration object 130 through the scanning system 100. In other words, with reference to the example of FIG. 5, the intercept-related value is determined for each portion 510, 520, 530, and 540 of the pin. The intercept-related value is determined by determining the amount of offset for the portion of the preliminary representation of the calibration object 130 such that the intercept-related value may be determined according to a predetermined slope-intercept equation.

A typical slope-intercept equation is represented as $$y = mx + b \qquad (5)$$

where y is an indication of distance in a vertical direction, x is an indication of distance in a horizontal direction, m is an indication of the slope of a line, and b is an indication of the intercept of the vertical axis by the line at the zero position on the horizontal axis. In such an equation, b is an intercept-related value. Thus, to determine the intercept-related value for a portion of a preliminary representation, the offset position of the preliminary representation is compared to the expected orientation of the calibration object 130. In the example of FIG. 5, the portions 510, 520, 530, and 540 of the pin each approximates a line with an offset relative to the expected position 550 of the vertically placed pin. In different embodiments, x may correspond to the channel number of the unsorted sinogram or to the view number of the sorted sinogram or to some function of the channel number of the unsorted sinogram or to some function of the view number of the sorted sinogram, and y may correspond to the measured table position of the unsorted sinogram or to the view index of the unsorted sinogram or to the ray index of the sorted sinogram or the ray position of the sorted sinogram or to some function of one of these values. Alternative forms are also possible by switching x and y but the above assignments ease calculations by keeping the slope finite when the measured ray position or ray index is mostly constant in a sorted sinogram.

A readily developed algorithm can derive the intercept-related value, or b of the above equation, from the position of a portion 510, 520, 530, or 540 of the pin. One such algorithm assumes a sorting algorithm is used which maps channel and position into a ray position using the equation:

$$r = SOD \; \sin\gamma[\text{channel}] + \left(pos + \frac{\text{backlash}}{2} \times dir - poscent\right)\cos\gamma[\text{channel}]$$

where SOD represents the source-to-object distance, γ[channel] represents the angle for a given detector channel relative to the line 330 perpendicular to the translation direction 320, pos represents the position along the translation axis of the translating table 120 relative to an arbitrary reference point used by the motion encoder, backlash is the backlash in the system 100, dir represents the direction of the scan (+1 when scanning in the direction of increasing detector channel number and −1 when scanning in the direction of decreasing channel number), and poscent represents the center position for the translation table 120 relative to the same reference point used to measure pos, and r is the distance between the rotation axis and the ray from the source to the detector channel when the table is at position pos. Applying this sorting algorithm with an incorrect value for backlash (represented as $\overline{\text{backlash}}$), source-to-object distance ($\overline{SOD}$), and the center position for the translation table 120 relative to the detector 115 and the source 110 ($\overline{\text{procent}}$), the same equation above can be used to predict the incorrect ray position ($\bar{r}$) where a datum will appear after sorting. The difference between the measured and true ray position can be written as a function of the incorrect and true geometry values:

$$\bar{r} - r = (\overline{SOD} - SOD)\sin\gamma + \left(\frac{\overline{\text{backlash}} - \text{backlash}}{2} \times dir - (\overline{\text{poscent}} - \text{poscent})\right)\cos\gamma$$

which may be rewritten as:

$$\frac{\bar{r} - r}{\cos\gamma} = (\overline{SOD} - SOD)\tan\gamma + \left(\frac{\overline{\text{backlash}} - \text{backlash}}{2} \times dir - (\overline{\text{poscent}} - \text{poscent})\right).$$

For a perfectly centered object, r equals 0 for the center of the object. Thus, if one uses a known algorithm to measure ($\bar{r}$) as the center of the pin after sorting with the incorrect geometry values, the locations should satisfy the equation $$\frac{\bar{r}}{\cos\gamma} = m \tan\gamma + b.$$

One can compare this equation to the slope-intercept equation by using $$y = \frac{\bar{r}}{\cos\gamma}$$

and x=tan γ for the slope-intercept equation y=mx+b assuming r is zero in the example where the pin is placed at the center or rotation axis of the translation table 120.

The intercept-related value can be determined from an arbitrary reference point relative to the portion 510, 520, 530, or 540 of the pin using the above equations. For example, according to the above slope-intercept equation, the intercept-related value for portions of the pin scanned while moving in the first direction, that in this example is defined by moving in the direction of increasing detector channel number, can be represented by the equation:

$$b_+ = \frac{\overline{\text{backlash}} - \text{backlash}}{2} - (\overline{\text{poscent}} - \text{poscent})$$

while the intercept-related value for portions of the pin scanned while moving in the second direction, that in this example is defined by moving in the direction of decreasing detector channel number, can be represented by the equation:

$$b_- = \frac{\overline{\text{backlash}} - \text{backlash}}{2} - (\overline{\text{poscent}} - \text{poscent}).$$

By taking the difference between these equations, the relationship between the actual and incorrect backlash values is found to be:

$$\text{backlash} = \overline{\text{backlash}} - (b_+ - b_-).$$

Thus, by fitting the sorted sinogram to the slope-intercept equation to find $b_+$ and $b_-$, we can determine the actual or new backlash value.

Therefore, in application, after determining the intercept-related values for each, or at least one of the, portions of the preliminary representations, the processor circuit 210 then averages 620 the intercept-related values for portions of the preliminary representation obtained while passing the calibration object 130 through the scanning system 100 in the first direction to obtain a first averaged intercept-related value, used in the equations above as $b_+$ to determine the new backlash value, and the processor circuit 210 averages 630 the intercept-related values for portions of the preliminary representation obtained while passing the calibration object 130 through the scanning system 100 in the second direction to obtain a second averaged intercept-related value, used in the equations above as $b-$ to determine the new backlash value. This step may be represented, for example, by the equations:

$$b_+ = \frac{2}{K} \sum_{k \, even} b_k \text{ and } b_- = \frac{2}{K} \sum_{k \, odd} b_k$$

where $b_+$ indicates the average intercept-related value for scans in the first direction, $b_-$ indicates the average intercept-related value for scans in the second direction, and K represents the total number of scans of the calibration object 130, for example the number of portions 510, 520, 530, and 540 of the pin in the displayed sorted sinogram 500.

An initial backlash value, represented above as the incorrect value for backlash ($\overline{backlash}$), is provided 640 either by the programming included with the system 100 in the automatic calibrator 220 or by a user through the input device(s) 230. The initial backlash value may be an approximate guess of the actual backlash value, or may be arbitrary. The amount of the initial backlash value is not overly critical because the initial backlash value operates as a starting point for determining a new backlash value that should be very close to the actual backlash value to reduce aberrations. The distance-traveled-per-snapshot value is determined 650 as described elsewhere herein.

The new backlash value is calculated 660 according to a predetermined function. Generally, this function may be as provided above. For the case where the data is sorted such that the data represents the rays approaching the detector 115 from the source are sorted to parallel and have equal distance between each other, the above equations may be modified because of the following relationship among the rays:

$$\frac{\bar{r}}{\Delta r} = (\overline{ray} - cray)$$

where $\Delta r$ represents the spacing between rays, which depends on the sorting algorithm but will often be equal to the average distance-per-snapshot value, $\overline{ray}$ represents the measured ray number for the center of the calibration object, and cray represents an arbitrary central ray number that is often set to the center of the sorted sinogram. Under this embodiment, the slope-intercept equation can be applied using $$y = \frac{(\overline{ray} - cray)}{\cos \gamma}$$

and $x = \tan \gamma$, and the new backlash value is determined according to the equation:

$$backlash = \overline{backlash} - (b_+ - b_-) \Delta r$$

where $\Delta r$ is as above. Thus, in this embodiment, the predetermined function is one of the initial backlash value, the sorted ray spacing, the first averaged intercept-related value, and the second averaged intercept-related value. In these various embodiments, the new backlash value is the predetermined calibration value using the intercept-related value that may then be used in the known algorithms for providing the reconstructed image with reduced aberrations.

With reference to FIG. 7 and continuing reference to FIG. 5, an embodiment of the determination 430 of the slope-related value and calculation 440 of a calibration value will be further described. The slope-related value is determined 710 for each portion of the preliminary representation corresponding to each pass of the calibration object 130 through the scanning system 100. In other words, with reference to the example of FIG. 5, the slope-related value is determined for each portion 510, 520, 530, and 540 of the pin. The slope-related value is determined by determining the amount of offset for the portion of the preliminary representation of the calibration object 130 such that the slope-related value may be determined according to a predetermined slope-intercept equation as described above. For example, according to the above general slope-intercept equation, the slope-related value, m, for portions of the pin in the sorted sinogram can be represented by the equation:

$$SOD = \overline{SOD} - m$$

where the incorrect source-to-object value $\overline{SOD}$ is the initial source-to-object value. More particularly, the slope-related value is the value $m_k$ in the alternative equation $$y = m_k x + b_k \text{ where } m_k = \frac{\Delta y}{\Delta x}.$$

A readily developed algorithm can derive the slope-related value, $m_k$, from the offset of each portion 510, 520, 530, or 540 of the pin. The processor circuit 210 then averages 720 the slope-related values to determine an average slope-related value, m. This step may be represented by the equation:

$$m = \frac{1}{K} \sum_{k=0}^{K-1} m_k$$

where K represents the total number of scans of the calibration object 130, for example the number of portions 510, 520, 530, and 540 of the pin in the displayed sorted sinogram 500.

The source-to-detector distance is provided 730 as discussed above. An initial source-to-object distance is provided 740 either by the programming included with the system 100 in the automatic calibrator 220 or by a user through the input device(s) 230. The initial source-to-object distance may be an approximate guess of the actual source-to-object distance, or may be arbitrary. The amount of the initial source-to-object distance is not overly critical because the initial source-to-object distance operates as a starting point for determining a new source-to-object distance that should be very close to the actual source-to-object distance to reduce aberrations. The distance-traveled-per-snapshot value is determined 650 as described above, and the detector pitch value is provided 750 as discussed above.

The new source-to-object distance is calculated 760 according to a predetermined function as generally indicated above. For the case where the data is sorted such that the data represents the rays approaching the detector 115 from the source are sorted to parallel and have equal distance between each other, the above equations may be modified because of the following relationship among the rays:

$$\frac{\bar{r}}{\Delta r} = (\overline{ray} - cray)$$

as discussed above. Under this embodiment, the new source-to-object distance may be described by the equation:

$$SOD = \overline{SOD} - m\Delta r.$$

Further approximations may be made to account for the shape of the detector 115, or also called the detector shape profile. This may be necessary if one is unable to measure or calculate the true channel angles. Taking into account the detector shape profile of an ideal curved detector 115 focused on the source 110, the following equation can be used to describe the plurality of angles:

$$\gamma = \Delta\gamma \times (channel - centdet)$$

where $\Delta\gamma$ is the angular channel spacing and centdet is the center detector channel number. The geometry of such a system teaches that $$\Delta\gamma = \frac{detPitch}{SID} = \frac{FanAngle}{NumChannels - 1}$$

where detPitch is the detector pitch value and SID is the source-to-detector distance. This equation can be applied to the above equations to provide slope- and intercept-related values used to calculate calibrations values for systems 100 with such a curved detector 115.

Subsequent calculations can be made to take into account an approximation for an ideal flat detector 115. For instance, the ideal flat detector may be approximated using the equation:

$$\gamma = \tan^{-1}\left(\frac{(channel - centdet) \times detPitch}{SID}\right)$$

where channel can also be replaced by the view number in the sorted sinogram. In view of these approximation equations for the flat detector 115 and the equations for the sorted sinogram, one may demonstrate that $$\frac{(\overline{ray} - cray)}{\cos\gamma} = \frac{1}{\Delta r}(\overline{SOD} - SOD)\frac{(channel - centdet) \times detPitch}{SID} +$$

-continued $$\frac{1}{\Delta r}\left(\frac{\overline{backlash} - backlash}{2} \times dir - (\overline{poscent} - poscent)\right)$$

where the rays are considered views from the individual detector channels. By comparing against the slope-intercept equation, the slope-intercept value for this embodiment relates to the source-to-object distance according to the equation:

$$SOD = \overline{SOD} - \frac{m\Delta r}{detPitch}SID.$$

Thus, in this embodiment, the actual or new source-to-object distance may be calculated according to a predetermined function of the source-to-detector distance, the initial source-to-object distance, the sorted sinogram ray spacing, the detector pitch value incorporated as part of the approximations described above, and the average slope-related value, m. One may also show that these approximations for the detector shape profile may be applied to determine the same backlash to intercept-related value equation:

$$backlash = \overline{backlash} - (b_+ - b_-)\Delta r$$

as discussed above. In these various embodiments, the source-to-object distance is the predetermined calibration value using the slope-related value that may then be used in the known algorithms for providing the reconstructed image with reduced aberrations.

According to the above equations, a further calibration value may be determined, the translation center value. The translation center value typically is the variable "poscent" that represents the center position for the translation table 120 relative to the detector 115 and the source 110. In the example of FIG. 3, this is the value reported by the motion encoder when the table 120 is in a position such that a ray from the source 110 perpendicular to the translate path 320 passes through the rotation axis of the table. When there is non-zero backlash, translation center is the value of the above definition for translation center while traveling in one direction, averaged with the value of the above definition while traveling in the opposite direction. According to the above general slope-intercept equation, the translation center value may be generally determined as:

$$poscent = \overline{poscent} + \frac{b_+ + b_-}{2}$$

such that the translation center value may be determined in relation to the intercept-related values. In the case where the data is sorted to parallel according to the above equations, the translation center value may be determined as $$poscent = \overline{poscent} + \left(\frac{b_+ + b_-}{2}\right)\Delta r$$

such that the translation center value may be determined in relation to the intercept-related values and the sorted ray spacing or distance-traveled-per-snapshot value.

In practice, a sorted sinogram typically needs to be accurate to within ¼ of a pixel of the display sorted sinogram for high quality reconstruction images. Thus, the slope-related calculations typically need to be accurate to approximately a value δ represented by the equation:

$$\delta = \frac{\frac{1}{4}}{N}$$

For example, for an ideal flat detector, the new source-to-object distance typically needs to be accurate to approximately a value ε represented by the equation:

$$\varepsilon = SID \times \frac{\frac{1}{4}}{N} \frac{\Delta r}{d}.$$

The value N is the number of views in each pass of a sorted sinogram or the number of detector channels given the appropriate approximations as described above.

Further, it has been found that in certain embodiments, particularly when approximating the ray spacing to be the distance-traveled-per-snapshot value and approximating the detector shape profile, or ignoring the cos γ term to simplify computation, repeating the calibration process using the new backlash value and new source-to-object distance from the previous operation of the method for the initial backlash value and initial source-to-object distance results in further reduced aberrations. Repetitions of the automatic calibration process more than about 3 times, however, often do not demonstrate further improvements. In other embodiments, there is no improvement from iterating the calibration process, and the calibration values are determined in a single step.

Thus, the CT scanning system described above can automatically determine certain calibration values that reduce aberrations in reconstructed images without manual adjustments by a user. Such a system reduces set up time and the need for specialized training for various users of the scanner.

Those skilled in the art will recognize that a wide variety of modifications, alterations, and combinations can be made with respect to the above described embodiments without departing from the spirit and scope of the invention. For example, the calibration method need not operate on every portion of the preliminary representation to calculate calibration values, and it need not operate on sorted data. Such modifications, alterations, and combinations are to be viewed as being within the ambit of the inventive concept.

I claim:

1. A method of automatically calibrating a computed tomography ("CT") scanning system comprising:
    providing a calibration object substantially centered on a translating table for passing through the CT scanning system;
    scanning the calibration object;
    providing a preliminary representation of the calibration object;
    determining an intercept-related value for at least a portion of the preliminary representation of the calibration object; and
    calculating in an automatic calibrator a predetermined calibration value using the intercept-related value.

2. The method of claim 1 further comprising
    passing the calibration object through the scanning system in a first direction; and
    passing the calibration object through the scanning system in a second direction opposite to the first direction.

3. The method of claim 2 further comprising rotating the calibration object a predetermined amount in between passes through the scanning system.

4. The method of claim 3 wherein the steps of claims 2 and 3 are performed a predetermined number of times and wherein the predetermined number of times comprises a number necessary to rotate the calibration object 360 degrees.

5. The method of claim 2 wherein the steps of claim 2 are performed a predetermined number of times.

6. The method of claim 2 wherein the step of determining an intercept-related value for at least a portion of the preliminary representation of the calibration object further comprises determining the intercept-related value for each portion of the preliminary representation corresponding to each pass of the calibration object through the scanning system; and
    wherein the step of calculating the predetermined calibration value using the intercept-related value further comprises averaging the intercept-related values for portions of the preliminary representation obtained while passing the calibration object through the scanning system in the first direction to obtain a first averaged intercept-related value and averaging the intercept-related values for portions of the preliminary representation obtained while passing the calibration object through the scanning system in the second direction to obtain a second averaged intercept-related value.

7. The method of claim 6 wherein the step of calculating the predetermined calibration value using the intercept-related value further comprises:
    providing an initial backlash value;
    determining a distance-traveled-per-snapshot value;
    calculating a new backlash value according to a predetermined function of the initial backlash value, the distance-traveled-per-snapshot value, the first averaged intercept-related value, and the second averaged intercept-related value.

8. The method of claim 7 wherein the method of claim 7 is repeated using the new backlash value from the previous operation of the method as the initial backlash value.

9. The method of claim 1 wherein the step of providing the preliminary representation of the calibration object further comprises providing a sorted sinogram of the calibration object.

10. The method of claim 9 wherein providing the sorted sinogram of the calibration object further comprises displaying the sorted sinogram.

11. The method of claim 1 wherein the step of determining an intercept-related value for at least a portion of the preliminary representation of the calibration object further comprises analyzing the portion of the preliminary representation of the calibration object to determine an amount of offset for the portion of the preliminary representation of the calibration object such that a slope-related value and the intercept-related value may be determined according to a predetermined slope-intercept equation.

12. A method of automatically calibrating a computed tomography ("CT") scanning system comprising:
    providing a calibration object substantially centered on a translating table for passing through the CT scanning system;
    scanning the calibration object;

providing a preliminary representation of the calibration object;

determining a slope-related value for at least a portion of the preliminary representation of the calibration object; and calculating in an automatic calibrator a predetermined calibration value using the slope-related value.

13. The method of claim 12 further comprising:

passing the calibration object through the scanning system in a first direction; and passing the calibration object through the scanning system in a second direction opposite to the first direction.

14. The method of claim 13 further comprising rotating the calibration object a predetermined amount in between passes through the scanning system.

15. The method of claim 14 wherein the steps of claims 13 and 14 are performed a predetermined number of times and wherein the predetermined number of times comprises a number necessary to rotate the calibration object 360 degrees.

16. The method of claim 13 wherein the steps of claim 13 are performed a predetermined number of times.

17. The method of claim 13 wherein the step of determining a slope-related value for at least a portion of the preliminary representation of the calibration object further comprises determining the slope-related value for each portion of the preliminary representation corresponding to each pass of the calibration object through the scanning system; and wherein the step of calculating the predetermined calibration value using the slope-related value further comprises averaging the slope-related values to determine an average slope-related value.

18. The method of claim 17 wherein the step of calculating the predetermined calibration value using the slope-related value further comprises:

providing a source-to-detector distance;

providing an initial source-to-object distance;

determining a distance-traveled-per-snapshot value;

providing a detector pitch value;

providing a detector shape profile; and calculating a new source-to-object distance according to a predetermined function of the source-to-detector distance, the initial source-to-object distance, the distance-traveled-per-snapshot value, the detector pitch value, and the average slope-related value.

19. The method of claim 18 wherein the method of claim 18 is repeated using the new source-to-object distance from the previous operation of the method as the initial source-to-object distance.

20. The method of claim 17 wherein the step of calculating the predetermined calibration value using the slope-related value further comprises:

providing a plurality of angles indicating, for each of a plurality of detector channels, an angle between a ray drawn from a source to the detector channel and a ray drawn from the source to a rotation axis;

providing an initial source-to-object distance;

determining a distance-traveled-per-snapshot value; and calculating a new source-to-object distance according to a predetermined function of the plurality of angles, the initial source-to-object distance, the distance-traveled-per-snapshot value, and the average slope-related value.

21. The method of claim 12 wherein the step of providing the preliminary representation of the calibration object further comprises providing a sorted sinogram of the calibration object.

22. The method of claim 21 wherein providing the sorted sinogram of the calibration object further comprises displaying the sorted sinogram.

23. The method of claim 12 wherein the step of determining a slope-related value for at least a portion of the preliminary representation of the calibration object further comprises analyzing the portion of the preliminary representation of the calibration object to determine an amount of offset for the portion of the preliminary representation of the calibration object such that the slope-related value and an intercept-related value may be determined according to a predetermined slope-intercept equation.

24. A computed tomography ("CT") scanning system comprising:

an X-ray source;

a detector opposite the X-ray source;

a translating table capable of moving an object between the X-ray source and the detector;

a data collector operably coupled to the detector for collecting data from the detector;

a memory circuit storing values regarding the CT scanning system;

a processor circuit associated with the data collector and the memory circuit for calculating a source-to-object distance and a backlash value for the scanning system according to a predetermined function of the data and the values regarding the CT scanning system.

25. The system of claim 24 wherein the values regarding the CT scanning system further comprise at least one of the group comprising:

a source-to-detector distance;

an initial source-to-object distance;

a distance-traveled-per-snapshot value;

a detector pitch value;

a detector shape profile;

an initial backlash value; and a plurality of angles indicating, for each of a plurality of detector channels, an angle between a ray drawn from a source to the detector channel and a ray drawn from the source to a rotation axis.

* * * * *